Sept. 17, 1968 YOSHIHARU TAKAHASHI 3,402,259
TELEVISION MONITORING SYSTEM
Filed Oct. 6, 1964 3 Sheets-Sheet 1

INVENTOR.
YOSHIHARU TAKAHASHI
BY McGlew and Toren
Attorneys

Sept. 17, 1968 YOSHIHARU TAKAHASHI 3,402,259

TELEVISION MONITORING SYSTEM

Filed Oct. 6, 1964 3 Sheets-Sheet 2

INVENTOR.
YOSHIHARU TAKAHASHI
BY McGlew and Toren
Attorneys

INVENTOR.
YOSHIHARU TAKAHASHI
BY McGlew and Toren
Attorneys 3,402,259
TELEVISION MONITORING SYSTEM
Yoshiharu Takahashi, 180 Tairamachi, Meguro-ku, Tokyo, Japan
Filed Oct. 6, 1964, Ser. No. 401,932
Claims priority, application Japan, Sept. 15, 1964, 39/52,759
5 Claims. (Cl. 178—7.1)

ABSTRACT OF THE DISCLOSURE

A television monitoring system is disclosed as including a multi-channel master receiver including a relatively large screen or picture tube, and a plurality of single-channel slave receivers each including a relatively small picture tube or screen, the slave receivers and the master receiver being grouped for ready visual observation, by being included in a common console. The master receiver is arranged to transduce both the video and the audio portion of a signal, whereas each slave receiver is preferably designed to transduce only the video portion of a signal.

Each slave receiver is connected, through a normally closed switch, to a respective source of television signals, such as an antenna or a television camera. Selector means are provided in association with the master receiver and selectively operable to operate a selected switch means to disconnect the associated television signal source from the associated slave receiver and connect the selected signal source to the master receiver. Respective metering means may be associated with each slave receiver.

This invention relates to a television monitoring system, consisting of a master monitor and several slave monitors, with the slave monitors comprising single channel tuned receivers corresponding to the number of television broadcasting stations which are to be monitored and in that area, in which said master monitor displays a television signal that is selected from one of said slave monitors at the discretion of an operator.

Further this invention relates to a television monitoring system, consisting of a master scope and several slave scopes, which latter receive signals corresponding to an equal number of television cameras, in which said master scope displays a television signal that is selected from one of said slave scopes at the discretion of the operator.

An object of the present invention is to provide a novel television monitoring system with selected signal display in a master monitor using a switch that transfers a signal from any slave monitor to said master monitor.

Another object of the present invention is to provide a novel television monitoring system with selected signal display in a master scope using simple switching that transfers a signal of any slave scope, to said master scope enabling the operator to monitor the television camera signals by using visual displays on the scopes and visual indications on the instruments of said system.

Figure 1:
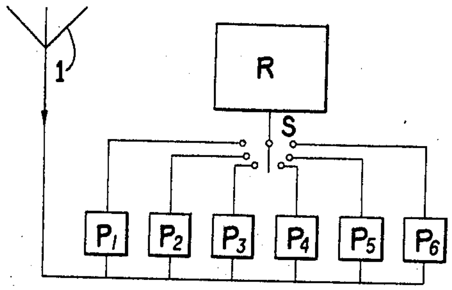
FIG. 1 is a schematic diagram of the system of this invention.

In FIG. 1, slave monitors $P_1$, $P_2$, $P_3$ and so forth are compact and simplified single channel tuned receivers.

The master monitor R is selectively set to receive and display the television image and voice signal of the selected slave monitor by means of a monitor selector switch S.

Figure 2:
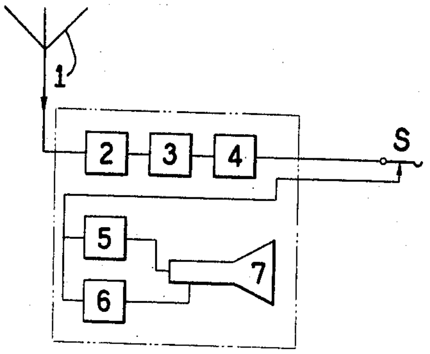
FIG. 2 is a schematic diagram of the slave monitor.

FIG. 2 shows a schematic diagram of an examplary slave monitor. A received signal is sent from the antenna 1 to the monitor screen, scope, or picture 7, for image display, through the single channel tuner 2, the video intermediate frequency amplifier 3, the video detector 4, the channel selector switch S, the video amplifier 5 and the sync-scanning circuit 6.

Each monitor scope $7_1$, $7_2$, $7_3$ (FIGS. 4 and 5) and so forth, corresponds to the individual monitor scope of the slave monitor $P_1$, $P_2$, $P_3$ and so forth. An operator can monitor all televised signals which are displayed in the slave monitors at first glance.

The monitor selector switch S selects a single channel tuner 2*n*, a video intermediate frequency amplifier 3*n* and a video detector 4*n* at an operator's desire, and connects the selected circuits to the master monitor. For simplification, not every or not any slave monitor need include voice channel circuits and a loudspeaker.

Figure 3:
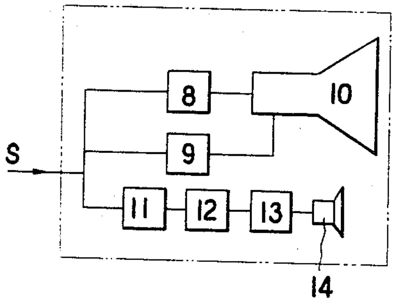
FIG. 3 is a schematic diagram of the master monitor.

In FIG. 3, the selected signal is impressed on the master monitor screen, scope or picture tube 10 through the master video amplifier 8 and the master sync-scanning circuit 9, to display the image of said signal, and also on a loudspeaker through the voice channel intermediate frequency amplifier 11, the voice channel detector 12 and the audio amplifier 13, to produce the audible portion of the signal.

Figure 4:
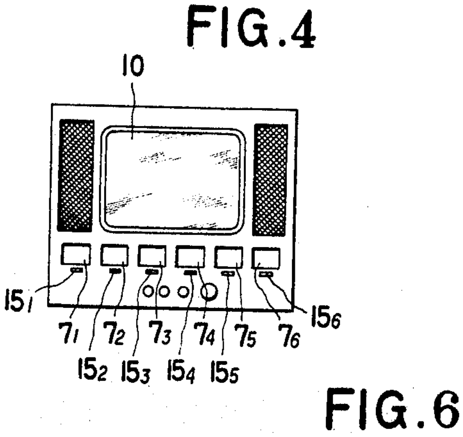
FIG. 4 and FIG. 5 are respective front views of the system of FIG. 1.
Figure 5:
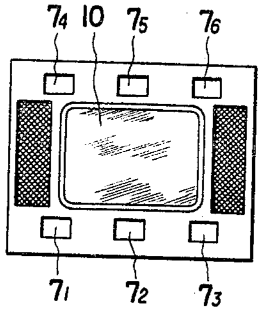

In FIG. 4, each number $15_1$, $15_2$, $15_3$ and so forth, indicates a respective channel selector control switch of the slave monitors. When an operator sets a channel selector control switch 15*n* at this pleasure, the channel selector switch S transfers an image from a monitor scope 7*n* to the master monitor 10, and the image on the slave monitor disappears. By using directional couplers, all televised signals impressed upon the antenna 1 are isolated.

As stated above, the features of the present inventions are to eliminate bothersome channel switchings of each monitor as compared to comparable prior art monitors and to unable an operator to monitor numerous televised signals at first glance and to watch the signal of the selected channel closely on a master monitor.

In further accordance with the present invention, the signals of television cameras to be monitored are selectively impressed on a master scope through slave scopes. These slaves scopes differ in size from the master scope, and the signals from the television cameras may be transmitted to the slave scopes by microwave radio links or cables.

The features of the present invention are to enable the operator to monitor a necessary signal in an enlarged version using the master scope, and to provide a unitary construction with slave scopes and other necessary accessories.

Figure 6:
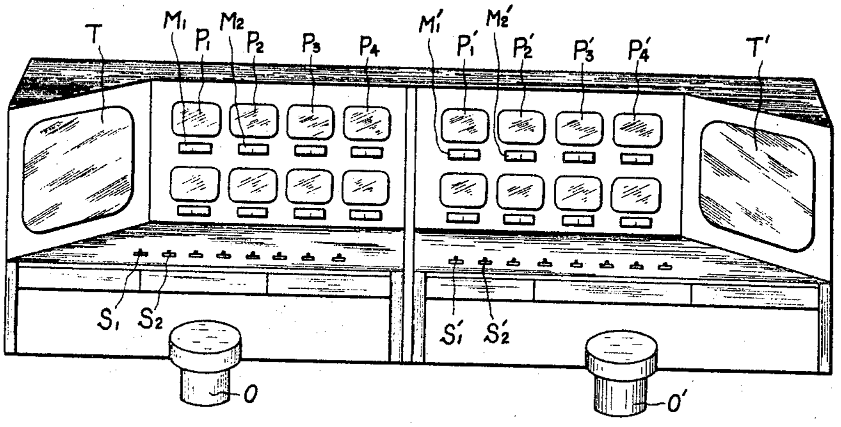
FIG. 6 and FIG. 7 are exemplary embodiments of this invention.
Figure 7:
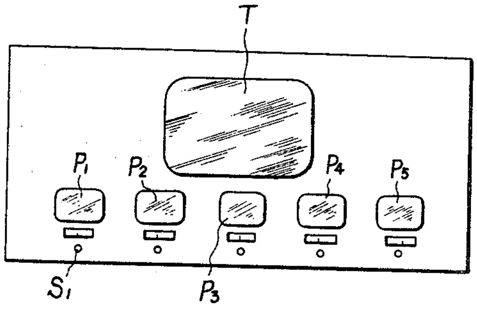

In FIGS. 6 and 7, slave scopes, comprising two groups of monitoring system, $P_1$, $P_2$, $P_3$, . . . $P_1'$, $P_2'$, $P_3'$ . . . and so forth, are compact, and they display signals of respective television cameras such as ITV signals. Instruments $M_1$, $M_2$, $M_3$, . . . $M_1'$, $M_2'$, $M_3'$ . . . and so forth, correspond to the number of slave scopes and indicate said signals instrumentally. Master scopes T and T' are used for each respective group of the system, and each master scope displays the signals selected from a slave scope with switching by switches $S_1$, $S_2$, $S_3$, . . . $S_1'$, $S_2'$, $S_3'$ . . . and so forth. The operator, just sitting on the seat O or O', can monitor all necessary signals at his discretion.

Figure 8:
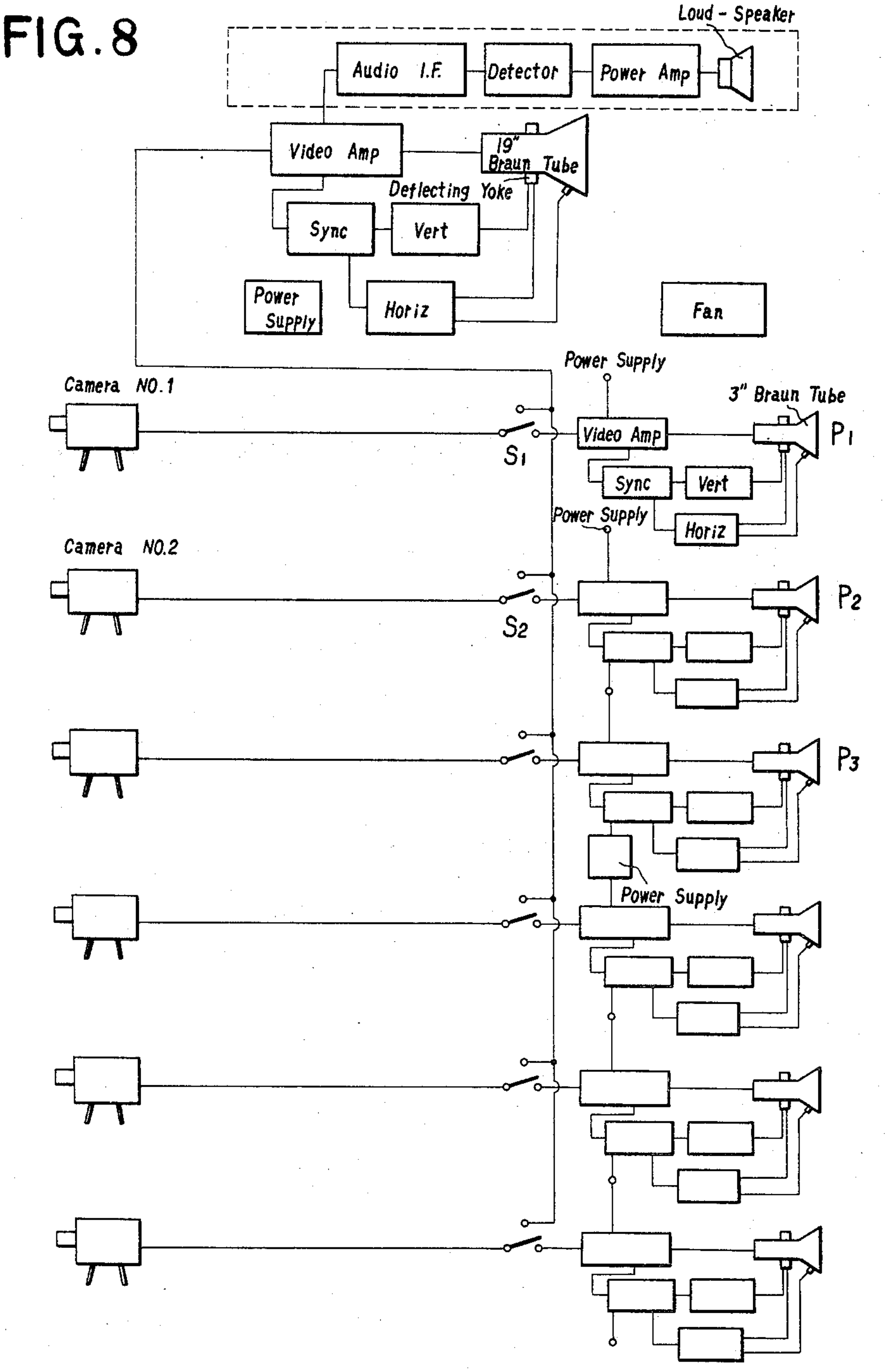
FIG. 8 is a schematic diagram of the system illustrated in FIG. 6.

As illustrated in FIG. 8, an output signal of the ITV camera No. 1 is sent to the slave scope $P_1$, for signal display, by cable and through the switch $S_1$, video amplifier, sync circuit, vertical scanner and horizontal scanner.

When the operator wants to monitor the signal of the camera No. 1, a simple switching is required. By depressing the switch $S_1$, the signal displayed on the slave scope $P_1$ is transferred to the master scope T through video circuits, and also the audio output signal related to camera No. 1 will be heard from the loud-speaker of the master scope panel. Thus, for simplification, it is not necessary that every or any slave panel include voice channel and loudspeaker.

What is claimed is:

1. A television monitoring system comprising, in combination, a multi-channel master television receiver including a relatively large screen; a plurality of single-channel slave television receivers, each including a relatively small screen, grouped with said master television receiver for ready visual observation; respective sources of television signals; respective double throw switch means each normally closed to a first position connecting a respective slave television receiver to an associated television signal source; and selector means operatively associated with said switch means and selectively operable to operate a selected switch means to a second position to disconnect the associated television signal source from the associated slave television receiver and connect the selected television signal source to said master television receiver, for detailed observation of the selected television signal source as transduced solely by the master television receiver.

2. A television monitoring system, as claimed in claim 1, in which said master television receiver and said slave television receivers are grouped in a common console.

3. A television monitoring system, as claimed in claim 1, wherein said master television receiver includes a sound transducer, said slave television receivers being capable of transducing only the video portion of a television signal.

4. A television monitoring system, as claimed in claim 1, in which said sources of television signals are respective antennas.

5. A television monitoring system, as claimed in claim 1, in which said sources of television signals are respective television cameras.

References Cited

UNITED STATES PATENTS

| | | | |
|---|---|---|---|
| 3,224,829 | 12/1965 | Forster. | |
| 3,079,462 | 2/1963 | Rosenthal | 178—6 |

FOREIGN PATENTS

| | | |
|---|---|---|
| 13,820 | 7/1964 | Japan. |

ROBERT L. GRIFFIN, *Primary Examiner.*

R. L. RICHARDSON, *Assistant Examiner.*